United States Patent
Lin

(10) Patent No.: US 12,291,396 B2
(45) Date of Patent: *May 6, 2025

(54) METHOD FOR CONTROLLING WAREHOUSE ROBOT TO STORE AND FETCH INVENTORY MATERIALS

(71) Applicant: HAI ROBOTICS CO., LTD., Guangdong (CN)

(72) Inventor: Han Lin, Guangdong (CN)

(73) Assignee: HAI ROBOTICS CO., LTD., Shenzhen Guangdong (CN)

( * ) Notice: Subject to any disclaimer, the term of this patent is extended or adjusted under 35 U.S.C. 154(b) by 673 days.

This patent is subject to a terminal disclaimer.

(21) Appl. No.: 17/585,828

(22) Filed: Jan. 27, 2022

(65) Prior Publication Data

US 2022/0153522 A1 May 19, 2022

Related U.S. Application Data

(63) Continuation of application No. PCT/CN2020/105514, filed on Jul. 29, 2020.

(30) Foreign Application Priority Data

Jul. 31, 2019 (CN) .......................... 201910703479.8

(51) Int. Cl.
*B65G 1/04* (2006.01)
*B25J 5/00* (2006.01)
(Continued)

(52) U.S. Cl.
CPC ......... *B65G 1/0435* (2013.01); *B65G 1/1373* (2013.01); *B65G 1/1375* (2013.01);
(Continued)

(58) Field of Classification Search
CPC ..... B65G 1/0435; B65G 1/1375; G06Q 20/18
See application file for complete search history.

(56) References Cited

U.S. PATENT DOCUMENTS

| | | |
|---|---|---|
| 3,549,025 A | 12/1970 | Messner |
| 3,556,329 A | 1/1971 | Johnston |

(Continued)

FOREIGN PATENT DOCUMENTS

| | | |
|---|---|---|
| CH | 680212 A5 | 7/1992 |
| CN | 2766681 Y | 3/2006 |

(Continued)

OTHER PUBLICATIONS

International Search Report for International Application PCT/CN2020/105514 mailed Oct. 30, 2020.

(Continued)

*Primary Examiner* — Timothy R Waggoner
(74) *Attorney, Agent, or Firm* — Frank Gao, Esq.

(57) ABSTRACT

The disclosure relates to a method for controlling a warehouse robot to store and fetch inventory materials. The method includes: instructing a material handling device to fetch a second inventory material located in the front row, and placing the second inventory material on a first tray; instructing the material handling device to fetch a first inventory material located in the back row, and placing the first inventory material on a second tray; and instructing the material handling device to return the second inventory material to the front row. By instructing the material handling device to fetch the inventory materials and storing the inventory materials in the trays, the inventory materials can be extracted from a designated shelf and stored in a warehouse, navigation is realized in a crowded warehouse filled with obstacles, and the inventory materials whose positions have been transferred can be processed.

20 Claims, 12 Drawing Sheets

(51) Int. Cl.

| | |
|---|---|
| *B25J 9/00* | (2006.01) |
| *B25J 9/10* | (2006.01) |
| *B25J 9/16* | (2006.01) |
| *B25J 15/00* | (2006.01) |
| *B65G 1/137* | (2006.01) |
| *B66F 9/06* | (2006.01) |
| *B66F 9/075* | (2006.01) |
| *B66F 9/12* | (2006.01) |
| *B66F 9/14* | (2006.01) |
| *G06Q 10/08* | (2024.01) |
| *G06T 7/70* | (2017.01) |

(52) U.S. Cl.
CPC ............. *B66F 9/063* (2013.01); *B66F 9/075* (2013.01); *B66F 9/122* (2013.01); *B66F 9/141* (2013.01); *G06Q 10/08* (2013.01); *B25J 5/007* (2013.01); *B25J 9/0009* (2013.01); *B25J 9/104* (2013.01); *B25J 9/1638* (2013.01); *B25J 9/1679* (2013.01); *B25J 15/0014* (2013.01); *B65G 1/0492* (2013.01); *B65G 1/137* (2013.01); *B65G 2203/0216* (2013.01); *B65G 2203/041* (2013.01); *G06T 7/70* (2017.01)

(56) References Cited

U.S. PATENT DOCUMENTS

| | | | |
|---|---|---|---|
| 3,727,778 A * | 4/1973 | Hollenbach | B66F 9/14 414/277 |
| 4,458,808 A | 7/1984 | Loomer | |
| 4,941,794 A | 7/1990 | Hara | |
| 5,104,277 A | 4/1992 | Bullock | |
| 5,938,710 A | 8/1999 | Lanza | |
| 7,010,404 B2 | 3/2006 | Ichijo | |
| 7,320,385 B2 | 1/2008 | Katae | |
| 9,365,348 B1 | 6/2016 | Agarwal | |
| 9,701,471 B2 | 7/2017 | Yamada | |
| 10,613,533 B1 | 4/2020 | Payson | |
| 10,683,171 B2 * | 6/2020 | Jarvis | G05D 1/661 |
| 10,815,055 B2 | 10/2020 | Overfield | |
| 10,894,663 B2 | 1/2021 | Kapust | |
| 10,957,569 B2 | 3/2021 | Tawyer | |
| 10,962,963 B2 | 3/2021 | Zanger | |
| 11,396,424 B2 * | 7/2022 | Cheng | B25J 13/08 |
| 11,427,405 B1 | 8/2022 | Theobald | |
| 11,718,472 B2 * | 8/2023 | Cheng | B65G 1/1373 414/217 |
| 2003/0185656 A1 | 10/2003 | Hansl | |
| 2004/0047714 A1 | 3/2004 | Poli | |
| 2006/0245862 A1 | 11/2006 | Hansl | |
| 2006/0248562 A1 | 11/2006 | Kitsukawa | |
| 2008/0044262 A1 | 2/2008 | Kim | |
| 2009/0162176 A1 | 6/2009 | Link | |
| 2013/0096713 A1 | 4/2013 | Takizawa | |
| 2013/0209203 A1 | 8/2013 | Rafols | |
| 2015/0032568 A1 | 1/2015 | Hellenbrand | |
| 2015/0210472 A1 | 7/2015 | Nakamura | |
| 2016/0236867 A1 | 8/2016 | Brazeau | |
| 2016/0305775 A1 | 10/2016 | Allen | |
| 2017/0032306 A1 | 2/2017 | Johnson | |
| 2017/0203443 A1 | 7/2017 | Lessing | |
| 2017/0225891 A1 | 8/2017 | Elazary | |
| 2017/0322561 A1 | 11/2017 | Stiernagle | |
| 2017/0334644 A1 | 11/2017 | Otto | |
| 2017/0334645 A1 | 11/2017 | Otto | |
| 2018/0127211 A1 | 5/2018 | Jarvis | |
| 2018/0127212 A1 | 5/2018 | Jarvis | |
| 2018/0305124 A1 | 10/2018 | Guo | |

FOREIGN PATENT DOCUMENTS

| | | |
|---|---|---|
| CN | 1791540 A | 6/2006 |
| CN | 101397118 A | 4/2009 |
| CN | 102825496 A | 12/2012 |
| CN | 203229120 U | 10/2013 |
| CN | 104619613 A | 3/2014 |
| CN | 104619614 A | 3/2014 |
| CN | 103723421 A | 4/2014 |
| CN | 104777835 A | 7/2015 |
| CN | 104837747 A | 8/2015 |
| CN | 204588619 U | 8/2015 |
| CN | 104875177 A | 9/2015 |
| CN | 104966186 A | 10/2015 |
| CN | 105600253 A | 5/2016 |
| CN | 105705441 A | 6/2016 |
| CN | 105752888 A | 7/2016 |
| CN | 105774859 A | 7/2016 |
| CN | 105775544 A | 7/2016 |
| CN | 205438526 U | 8/2016 |
| CN | 105945935 A | 9/2016 |
| CN | 106005866 A | 10/2016 |
| CN | 106044645 A | 10/2016 |
| CN | 107667061 A | 10/2016 |
| CN | 106081455 A | 11/2016 |
| CN | 106276011 A | 1/2017 |
| CN | 106379681 A | 2/2017 |
| CN | 106426077 A | 2/2017 |
| CN | 106429148 A | 2/2017 |
| CN | 106882553 A | 6/2017 |
| CN | 106892014 A | 6/2017 |
| CN | 106927179 A | 7/2017 |
| CN | 206373907 U | 8/2017 |
| CN | 107226310 A | 10/2017 |
| CN | 107253201 A | 10/2017 |
| CN | 206569571 U | 10/2017 |
| CN | 107336212 A | 11/2017 |
| CN | 108069180 A | 5/2018 |
| CN | 108122016 A | 6/2018 |
| CN | 108190341 A | 6/2018 |
| CN | 108217038 A | 6/2018 |
| CN | 108341201 A | 7/2018 |
| CN | 108383043 A | 8/2018 |
| CN | 108408316 A | 8/2018 |
| CN | 207684811 U | 8/2018 |
| CN | 209023571 U | 6/2019 |
| CN | 110498172 A | 11/2019 |
| DE | 2034834 A1 | 1/1972 |
| DE | 29808762 U1 | 11/1998 |
| DE | 102004013353 A1 | 10/2005 |
| DE | 102011002322 A1 | 10/2012 |
| DE | 102014007539 A1 | 11/2015 |
| DE | 102017219739 A1 | 5/2019 |
| EP | 0302205 A2 | 2/1989 |
| EP | 2008960 A2 | 12/2008 |
| EP | 2351698 A1 | 8/2011 |
| EP | 0634115 A1 | 9/2013 |
| EP | 2634115 A1 | 9/2013 |
| EP | 3192616 A1 | 7/2017 |
| GB | 2080265 A | 2/1982 |
| GB | 2336838 A | 11/1999 |
| JP | S505311 U | 1/1975 |
| JP | S6160504 A | 3/1986 |
| JP | H03152007 A | 6/1991 |
| JP | H047509 U | 1/1992 |
| JP | H0428700 A | 1/1992 |
| JP | H06239410 A | 8/1994 |
| JP | H1111611 A | 1/1999 |
| JP | H1179321 A | 3/1999 |
| JP | 2003029837 A | 1/2003 |
| JP | 2003237908 A | 8/2003 |
| JP | 2003285903 A | 10/2003 |
| JP | 2006088235 A | 4/2006 |
| JP | 2008238959 A | 10/2008 |
| JP | 2010042921 A | 2/2010 |
| JP | 2010208816 A | 9/2010 |
| JP | 2011020794 A | 2/2011 |
| JP | 2012093278 A | 5/2012 |
| JP | 2013023320 A | 2/2013 |
| JP | 5413413 B2 | 2/2014 |
| JP | 2014051345 A | 3/2014 |
| JP | 2015124023 A | 7/2015 |
| JP | 2015171933 A | 10/2015 |

(56) References Cited

FOREIGN PATENT DOCUMENTS

| | | |
|---|---|---|
| KR | 20130064580 A | 6/2013 |
| KR | 20160067638 A | 6/2016 |
| KR | 1020160067638 A | 6/2016 |
| KR | 101677497 B1 | 11/2016 |
| RU | 2404043 C1 | 11/2010 |
| SU | 867871 A1 | 9/1981 |
| SU | 1370017 A1 | 1/1988 |
| TW | 201643088 A | 12/2016 |
| WO | WO2011158422 A1 | 12/2011 |
| WO | WO2014034174 A1 | 3/2014 |
| WO | WO2016151505 A1 | 9/2016 |
| WO | WO2017044747 A1 | 3/2017 |
| WO | WO2017121747 A1 | 7/2017 |
| WO | WO2017205390 A2 | 11/2017 |
| WO | WO2018064639 A1 | 4/2018 |
| WO | WO2018064839 A1 | 4/2018 |
| WO | WO2018129738 A1 | 7/2018 |
| WO | WO2018140471 A1 | 8/2018 |
| WO | WO2019011276 A1 | 1/2019 |
| WO | WO2019095803 A1 | 5/2019 |
| WO | WO2019095804 A1 | 5/2019 |

OTHER PUBLICATIONS

Written Opinion for International Application PCT/CN2020/105514 mailed Oct. 30, 2020.
The NFOA of corresponding U.S. Appl. No. 18/667,101 dated Aug. 14, 2024.
The first Office Action of corresponding Australian application No. 2023214308, dated Aug. 14, 2024.

* cited by examiner

METHOD FOR CONTROLLING WAREHOUSE ROBOT TO STORE AND FETCH INVENTORY MATERIALS

CROSS-REFERENCE TO RELATED APPLICATIONS

This application is a continuation under 35 U.S.C. § 120 of International Patent Application No. PCT/CN2020/105514 filed on Jul. 29, 2020, which claims priority to Chinese patent application No. 201910703479.8 filed on Jul. 31, 2019, both of which incorporated herein by reference in its entirety.

TECHNICAL FIELD

The present invention relates to the field of intelligent warehousing, and in particular, to a method for controlling a warehouse robot to store and fetch inventory materials.

BACKGROUND

Machines have been used in a warehouse to transport goods from the warehouse to a shipping dock, or vice versa. In the beginning, machines were mainly used to carry heavy goods or large materials to save humans from exhausting labor. The latest developments in artificial intelligence and robotics have produced advanced machines. These machines seek to replace humans in both the industrial environment and a lot of areas of daily life.

Although there are a lot of reports on the progress of automation and artificial intelligence, accuracy and flexibility are still two areas where robots lag behind humans. In warehouse setting, a fully automated machine may accept an order, fetch a material from the warehouse, and transport the material to a designated place, which is more fantastic than reality. Some well-known systems, such as a Kiva system, can complete simple mechanical movement of large shelves from one designated position to another designated position. However, the function of a full-automatic system, for example, extracting an inventory material from the designated shelf and storing the inventory material in the warehouse, realizing navigation in a crowded warehouse filled with obstacles, and processing the inventory materials whose positions have been transferred, has not yet been implemented in a commercial warehouse robot system.

SUMMARY

Therefore, the present invention is intended to provide a method for controlling a warehouse robot to store and fetch inventory materials, so that the warehouse robot can store and fetch the inventory material as instructed. The warehouse robot system disclosed herein is flexible, efficient, and fault-tolerant, and is especially suitable for use in a warehouse stacked with shelves.

To resolve the foregoing technical problem, the embodiments of the present invention provide the following technical solutions:

A method for controlling a warehouse robot to store and fetch inventory materials is provided. The inventory materials on a shelf are arranged in a front row and a back row. The method includes: receiving an instruction of transporting a first inventory material; acquiring positioning information of the first inventory material from the received instruction, where the positioning information of the first inventory material includes a position, a depth, and an orientation of the first inventory material, where the depth of the first inventory material indicates that the first inventory material is located in the back row; instructing the warehouse robot to move to the position of the first inventory material; detecting whether a second inventory material is located in the front row of the first inventory material; extending a material handling device to the back row to acquire the first inventory material if no second inventory material exists in the front row; fetching the second inventory material from the front row and placing the second inventory material on an empty first tray if the second inventory material exists in the front row; fetching the first inventory material from the back row and placing the first inventory material on an empty second tray; and returning the second inventory material to the shelf.

In some embodiments, the position of the first inventory material includes coordinates and a height of the first inventory material; and the instructing the warehouse robot to move to the position of the first inventory material includes: instructing the warehouse robot to move to a position near the coordinates of the first inventory material; and instructing the material handling device to rise or fall to the height of the first inventory material.

In some embodiments, the instructing the warehouse robot to move to the position of the first inventory material further includes: instructing the material handling device to rotate to the orientation of the first inventory material.

In some embodiments, the first inventory material or the second inventory material is set as a designated material, and the fetching the first inventory material or the fetching the second inventory material includes: instructing the warehouse robot to acquire a relative position of the designated inventory material to the material handling device; calculating a position deviation of the designated inventory material based on the relative position of the designated inventory material to the material handling device; adjusting a posture of the warehouse robot to compensate for the position deviation of the designated inventory material; and instructing the material handling device to extend out.

In some embodiments, the fetching the first inventory material or the fetching the second inventory material further includes: after adjusting the posture of the warehouse robot and before the material handling device extending out, instructing the warehouse robot to acquire the relative position of the designated inventory material to the material handling device again, updating the relative position of the designated inventory material to the material handling device in a database, recalculating the position deviation of the designated inventory material based on the updated relative position, and readjusting the posture of the warehouse robot according to the recalculated position deviation.

In some embodiments, the fetching the first inventory material or the fetching the second inventory material further includes: after adjusting the posture of the warehouse robot and before the material handling device extending out, determining whether the material handling device is to collide with the shelf when extending out.

In some embodiments, the material handling device is instructed to rise and fall to read an identification code of the shelf, relative position of the material handling device to the shelf are acquired according to the identification code of the shelf, and it is determined, according to the relative position of the material handling device to the shelf, whether the material handling device is to collide with the shelf when extending out.

In some embodiments, the designated inventory material is the first inventory material, and the instructing the material handling device to extend out includes: instructing the material handling device to extend to the front row; instructing the warehouse robot to acquire a relative position of the first inventory material to the material handling device; calculating the position deviation of the designated inventory material based on the relative position of the first inventory material to the material handling device; adjusting the posture of the warehouse robot to compensate for a position deviation of the first inventory material; and instructing the material handling device to continue to extend to the back row.

In some embodiments, the instructing the material handling device to extend out further includes: instructing the material handling device to continue to extend out by a preset distance if the warehouse robot fails to acquire the relative position of the first inventory material to the material handling device, and instructing the warehouse robot to acquire the relative position of the first inventory material to the material handling device again during the extension of the material handling device.

In some embodiments, the instructing the material handling device to extend out further includes: after adjusting the posture of the warehouse robot and before the material handling device continuing to extend to the back row, instructing the warehouse robot to acquire the relative position of the first inventory material to the material handling device again, updating the relative position of the first inventory material to the material handling device in a database, recalculating the position deviation of the first inventory material based on the updated relative position, and readjusting the posture of the warehouse robot according to the recalculated position deviation.

In some embodiments, the relative position of the designated inventory material to the material handling device are acquired by instructing the material handling device to capture image information of the designated inventory material and by processing the image information according to an image difference algorithm.

In some embodiments, the relative position of the designated inventory material to the material handling device are acquired by an identification code of the designated inventory material read by the material handling device.

In some embodiments, if the material handling device fails to read the identification code of the designated inventory material, the material handling device is instructed to repeatedly rise and fall by a preset amplitude, and during the rise and fall of the material handling device, the material handling device is instructed again to read the identification code of the designated inventory material.

In some embodiments, when the material handling device successfully reads the identification code of the designated inventory material, it is determined whether the identification code is upside down.

In some embodiments, the adjusting a posture of the warehouse robot includes: adjusting a chassis of the warehouse robot, and/or rotating the material handling device if the identification code of the designated inventory material within a field of view of the material handling device is not complete, so that the identification code of the designated inventory material within a field of view of a camera is more complete.

Compared with the prior art, according to the method for controlling a warehouse robot to store and fetch inventory materials provided in this application, by instructing the material handling device to fetch the inventory materials and storing the inventory materials in the trays, the inventory materials can be extracted from a designated shelf and stored in a warehouse, navigation is realized in a crowded warehouse filled with obstacles, and the inventory materials whose positions have been transferred can be processed.

In addition, by instructing the material handling device to fetch the first inventory material located behind the second inventory material, the shelf may be arranged in a front row and a back row, thereby reducing the area occupied by the shelf in the warehouse, and facilitating the fetching of hidden inventory materials.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Embodiments of the present invention are described more fully below with reference to the accompanying drawings, in which preferred embodiments of the present invention are shown. However, various embodiments of the present invention may be embodied in many different forms and should not be construed as limited to the embodiments described herein. Conversely, these embodiments are provided, so that the present disclosure is thorough and complete, and the scope of the present disclosure is completely conveyed to those skilled in the art.

Figure 1:
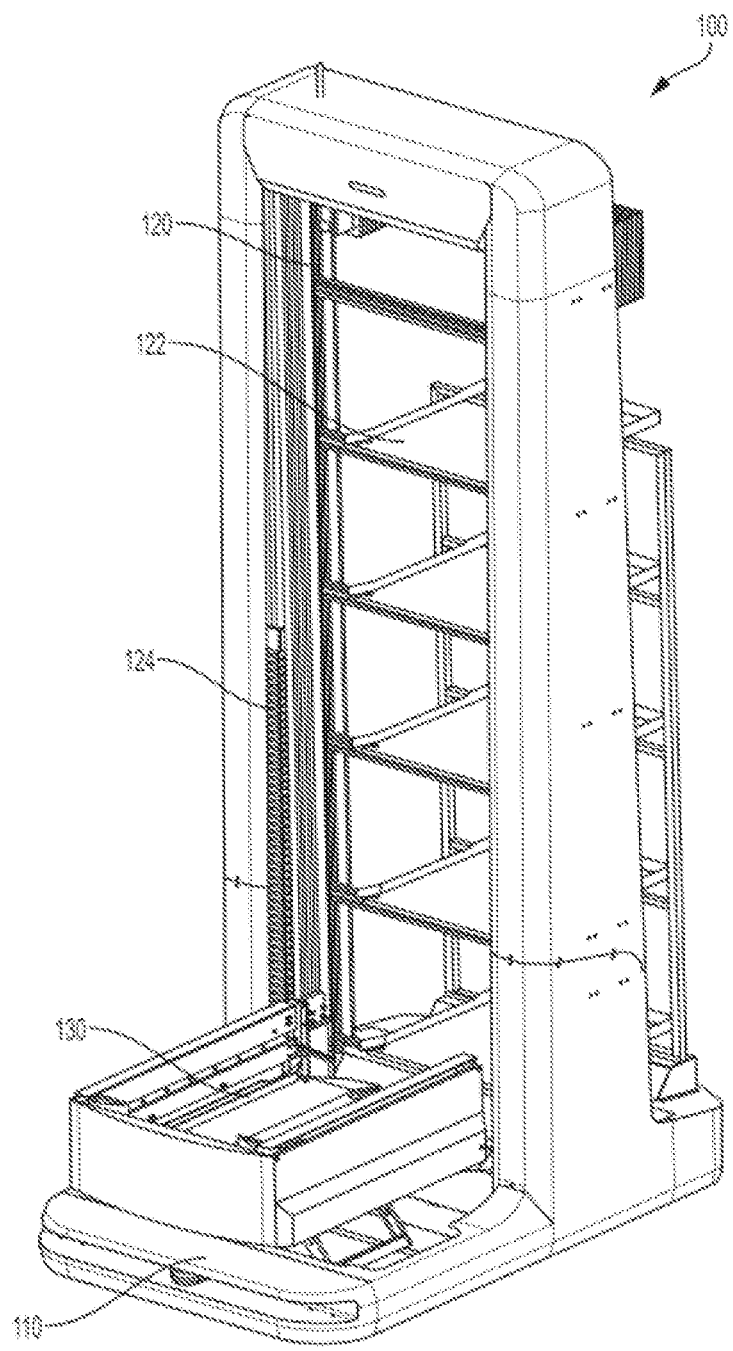
FIG. 1 is an exemplary illustration of an automatic guided vehicle (AGV) specifically designed for a warehouse.

Referring to FIG. 1, an automatic guided vehicle (AGV) 100 of one embodiment includes a driving unit 110, a multi-level shelf 120, and a material handling device 130. The driving unit 110 is configured to drive and propel the AGV 100. The multi-level shelf 120 includes one or more flat plates 122 and a lifting device 124. The lifting device 124 is connected to the material handling device 130 and may lift or lower the material handling device 130. In FIG. 6a to FIG. 6d, the material handling device 130 includes a tray, a lateral device, and a telescopic device, which are to be explained in subsequent sections of the present disclosure.

Figure 2:
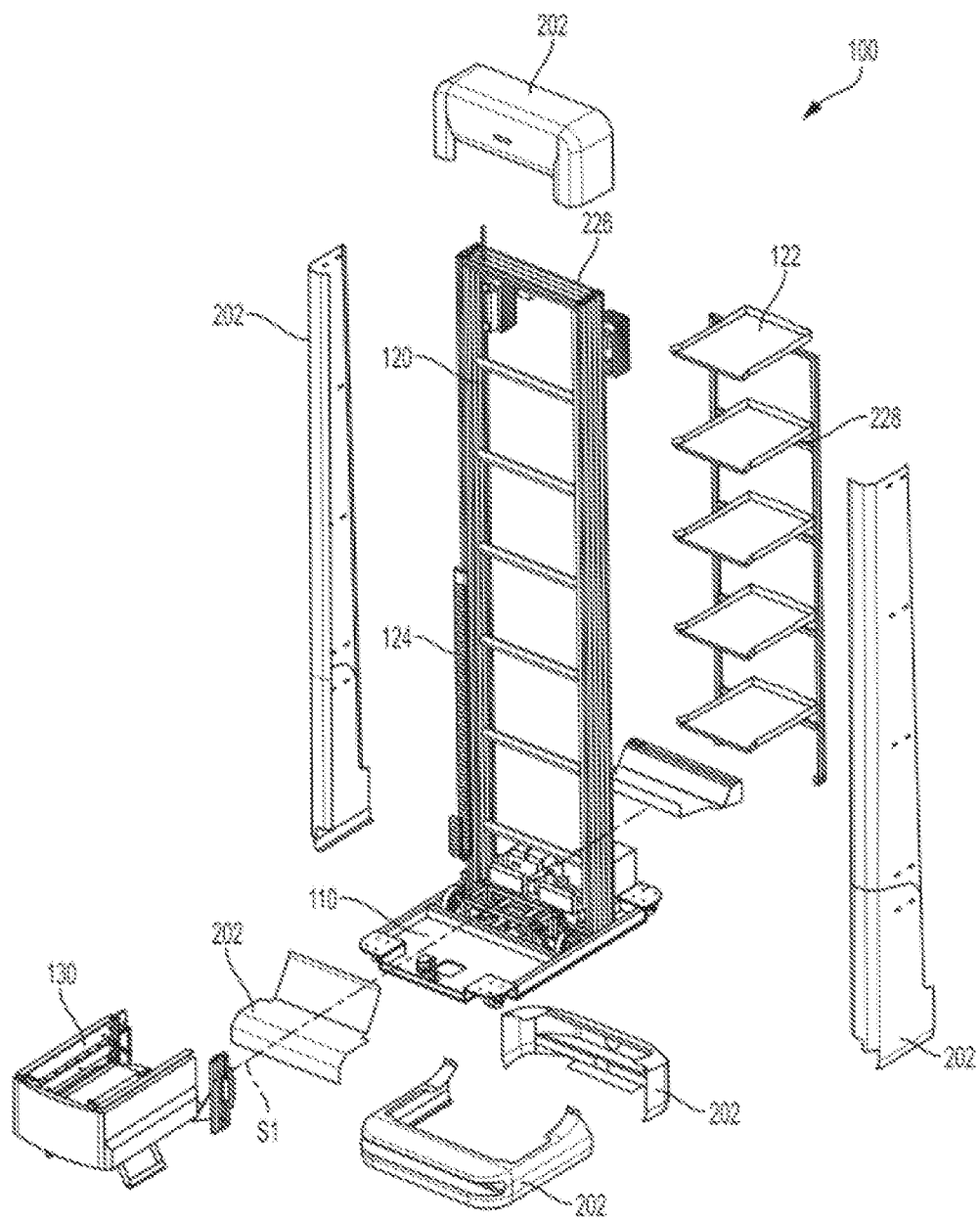
FIG. 2 is an exemplary disassembly illustration of a warehouse AGV robot.
Figure 3:
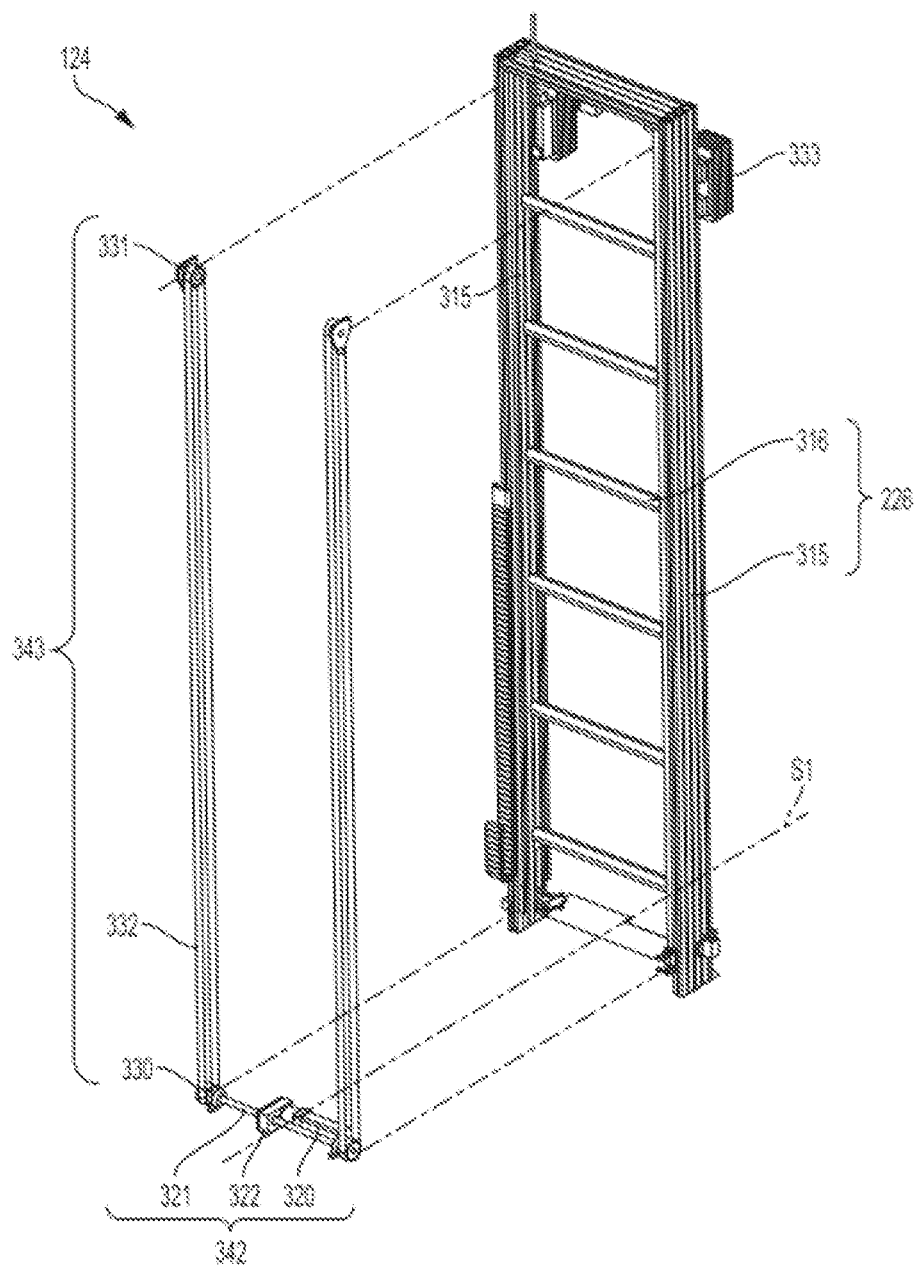
FIG. 3 is an exemplary illustration of a lifting device as part of a multi-level shelf.

FIG. 2 is an exploded view of the AGV 100 according to one embodiment. FIG. 2 shows internal components within a housing 202. In FIG. 2, the multi-level shelf 120 is shown to include a vertical frame 226, a bracket 228 supporting the flat plate 122, and the lifting device 124. FIG. 3 illustrates more details of the vertical frame 226 and the lifting device 124. The bracket 226 includes two vertical posts 315 and a plurality of vertical rods 316. The lifting device 124 includes two synchronous wheel driving devices 343 and a lifting driving mechanism 342.

The two synchronous wheel driving devices 343 are mounted to the vertical posts 315. In some embodiments, the lifting device 124 may include more than two synchronous wheel driving devices 343. As shown in FIG. 3, each of the synchronous wheel driving devices 343 includes a tensioning wheel 331, a driving synchronous wheel 330, and a synchronous belt 332. The synchronous wheel driving device 343 is connected to the lifting driving mechanism 342. The lifting driving mechanism 342 drives the driving synchronous wheel 330 to move the belt 332, so as to lift the material handling device 130 up and down the multi-level shelf 120. In FIG. 3, the lifting driving mechanism 342 of one embodiment includes a motor 320, a driving shaft 321, and a gear box 322. In some embodiments, the motor 320 may be replaced with a hydraulic transmission system or a pneumatic motor or any other type of motor. The driving shaft 321 connects the driving synchronous wheel 330 to the motor 320 through the gear box 322, and transmits kinetic energy of the motor 320 to the driving synchronous wheel 330 to drive the lifting device 124. In some embodiments, the driving shaft 321 is connected to two driving synchronous wheels (not shown) to ensure that the two driving synchronous wheels move synchronously. In FIG. 3, two balancing blocks 333 are mounted to a top of the multi-level shelf 120. Due to the weight conveyed by the balancing blocks 333, the balancing blocks 333 are movable along the vertical post 315, and may control and buffer the movement and momentum of the lifting device 124. It is to be noted that in FIG. 3, the lifting device 124 is implemented as a synchronous wheel driving system. Other mechanisms using chain wheels, gears and racks, worm gears, and/or lifting screws may also be used for implementing the lifting device 124.

After the material handling device 130 is moved aside, the driving device 110 is disassembled in FIG. 2. Details of the driving device 110 are shown in the exploded view of the driving device 110 in FIG. 4. The driving unit 110 in FIG. 4 includes a base 422, a shaft seat 415, and a shock absorber bracket 425. The vertical post 315 is fixed to the base 422, so as to mount the multi-level shelf 120 to the driving device 110.

The base has two surfaces, one upper surface 421, and one lower surface 420. On the upper surface 421 of the base, the shaft seat 415 and the shock absorber bracket 425 are used to accommodate two driving wheels 413 through a driving wheel groove 426 and a mounting groove 424. The mounting groove 424 is located in the middle of the base 422, and the two driving wheels 413 are located below the mounting groove 424 to support the base 422. Four driven wheels 412 are also mounted to four corners of the base 422 to provide support and facilitate movement. The four driven wheels 412 are mounted in the driving wheel groove 426. In some embodiments, more or less than four driven wheels may be mounted. The driven wheel may be a universal wheel or other types of steering wheels.

Figure 4:
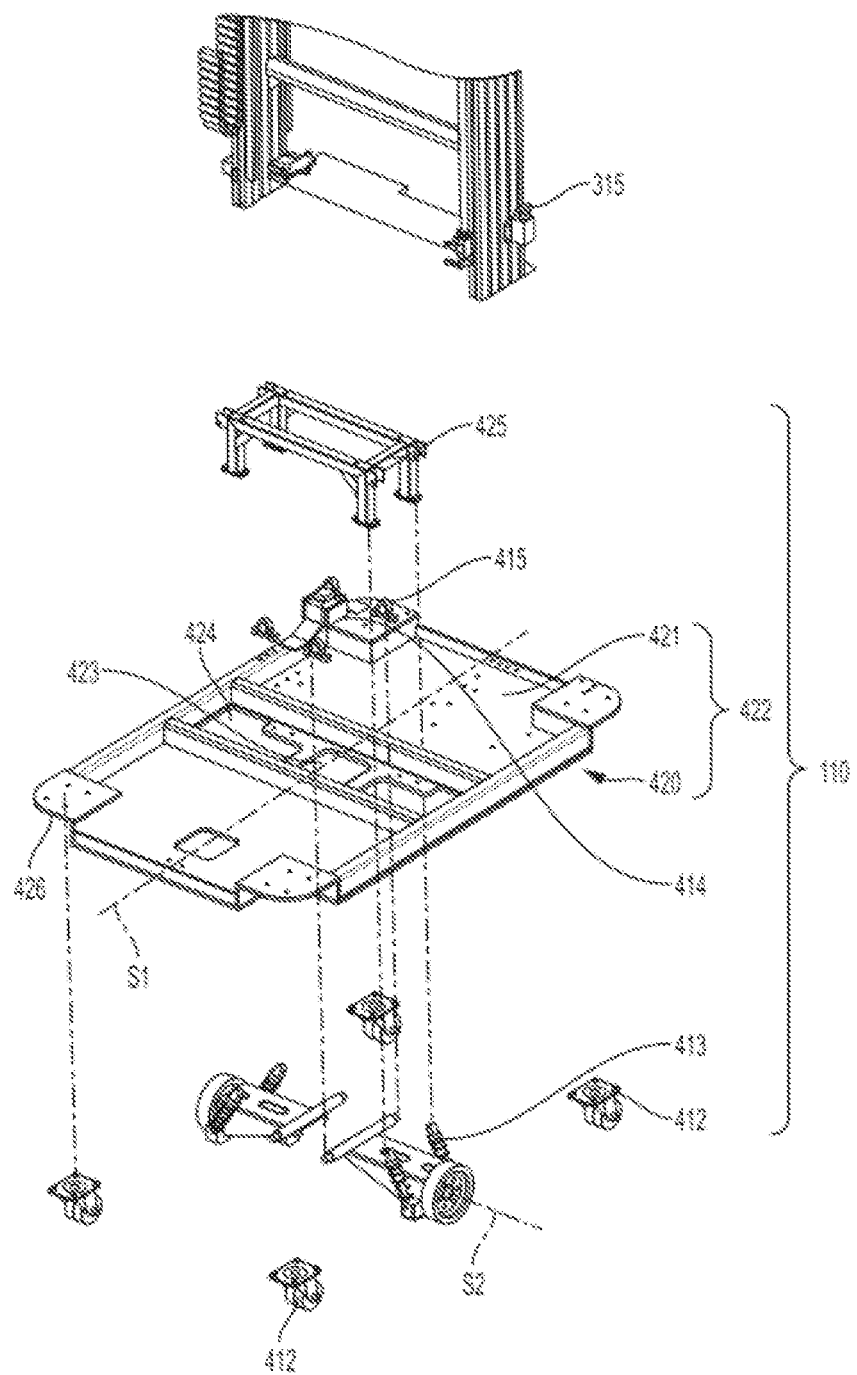
FIG. 4 is an exemplary illustration of a driving device.
Figure 5:
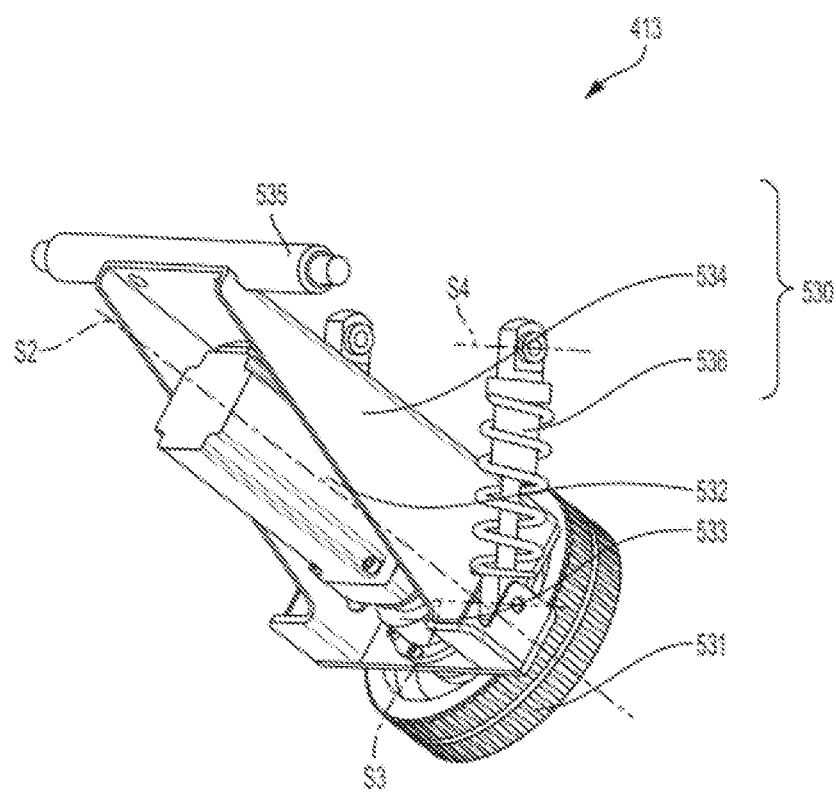
FIG. 5 is an exemplary illustration of a driving device using a motor.

FIG. 5 illustrates one embodiment of the driving wheel 413. The driving wheel 413 includes a driving wheel bracket 530, a driving wheel body 531, a hub driving device 532, and a hub reduction gear 533. The driving wheel bracket 530 includes a pair of hub brackets 534, a shaft body 535, and a pair of shock absorbers 536. The hub driving device 532 is mounted to the middle of the driving wheel bracket 530 along a central shaft S2. The hub driving device 532 is connected to the driving wheel body 531 to provide a driving force for driving the driving wheel 413. The hub driving device 532 is located between the hub brackets 534. The two shock absorbers 536 are respectively located on one side of each hub bracket 534. The shock absorbers 536 are connected to the shock absorber bracket 425 shown in FIG. 4 through the mounting groove 424. The hub brackets 534 are connected to the shaft body 535, and the shaft body 535 is also connected to the shaft seat 415 through the mounting groove 424. Each shock absorber 536 and the each hub bracket 534 form an included angle. This structure may be used to absorb shock or eccentric forces, especially when the AGV 100 is turning. In some embodiments, the hub driving device 532 may be a motor, a hydraulic transmission system, a pneumatic motor, or other types of motors.

As shown in FIG. 1, the AGV 100 of one embodiment includes the multi-level shelf 120 shown in FIG. 2 and FIG. 3, the driving device 110 shown in FIG. 4, and the material handling device 130 shown in FIG. 6a to FIG. 6d.

Figure 6A:
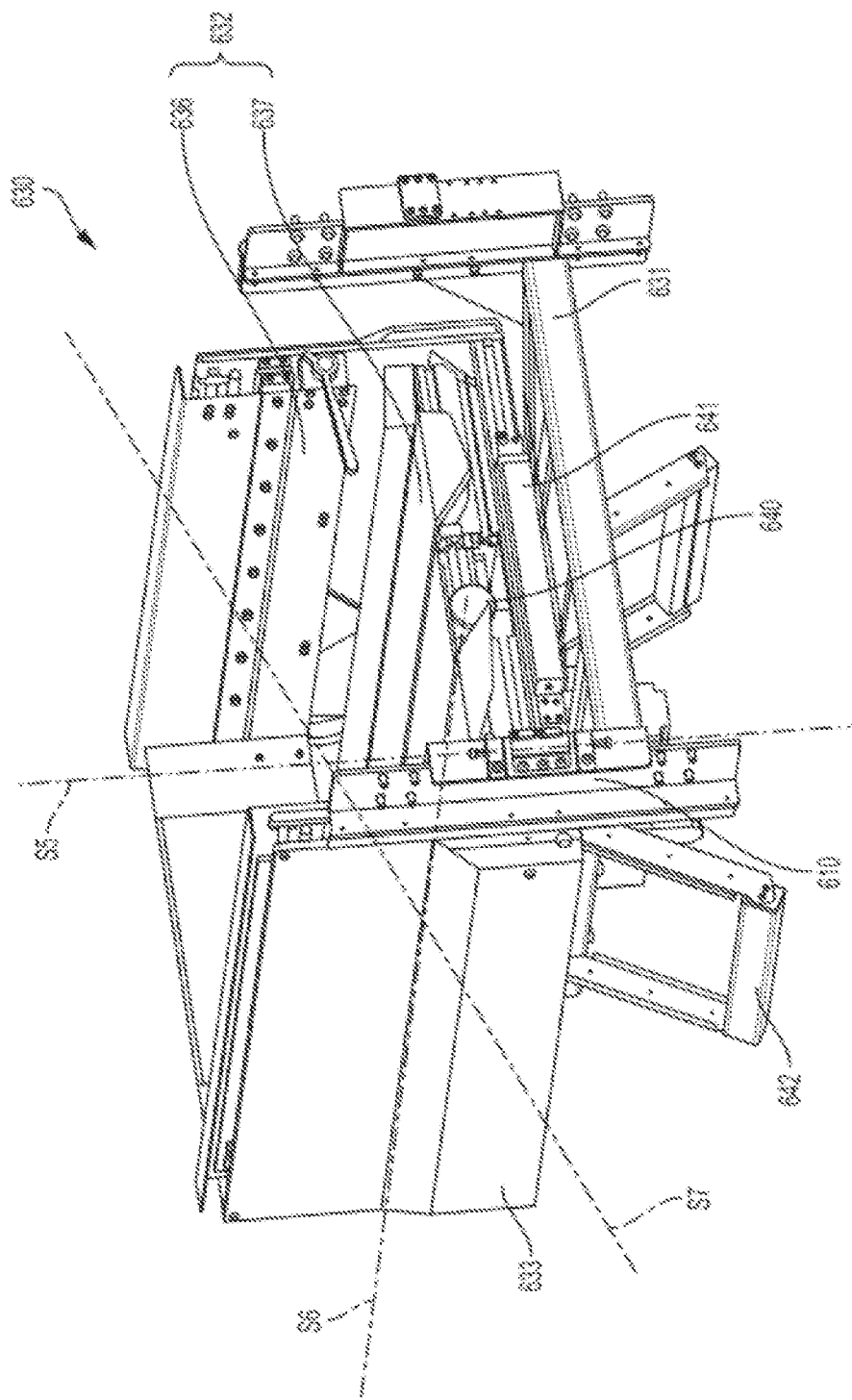
FIG. 6a to FIG. 6d are exemplary illustrations of parts of a material handling device.

In FIG. 6a, the material handling device 130 is shown to include a tray 633, a robotic arm 632, a bracket 631, two slidable members 610, a camera 640, a main lighting device 641, and an auxiliary lighting device 642. Two robotic anus 632 are disposed. One robotic arm is disposed on each side of the tray. However, only one robotic arm is shown in FIG. 6. Furthermore, only one of the two slidable members 610 is shown in FIG. 6a.

In FIG. 6a, three shafts S5, S6, and S7 are shown. The material handling device 130 may extend out or retract along S6 by means of the movement of the slidable member 610. The material handling device 130 may further be laterally movable. In some embodiments, in order to achieve the lateral movement, the material handling device 130 is configured to be rotatable about S5. In one embodiment, the material handling device 130 is configured to rotate the tray 633 to the left or right by 90°. In some other embodiments, in order to achieve the lateral movement, the material handling device 130 is configured to move the tray 633 to the left or right. In order to pan the tray 633, the material handling device 130 moves the tray 633 parallel to S7.

Figure 6B:
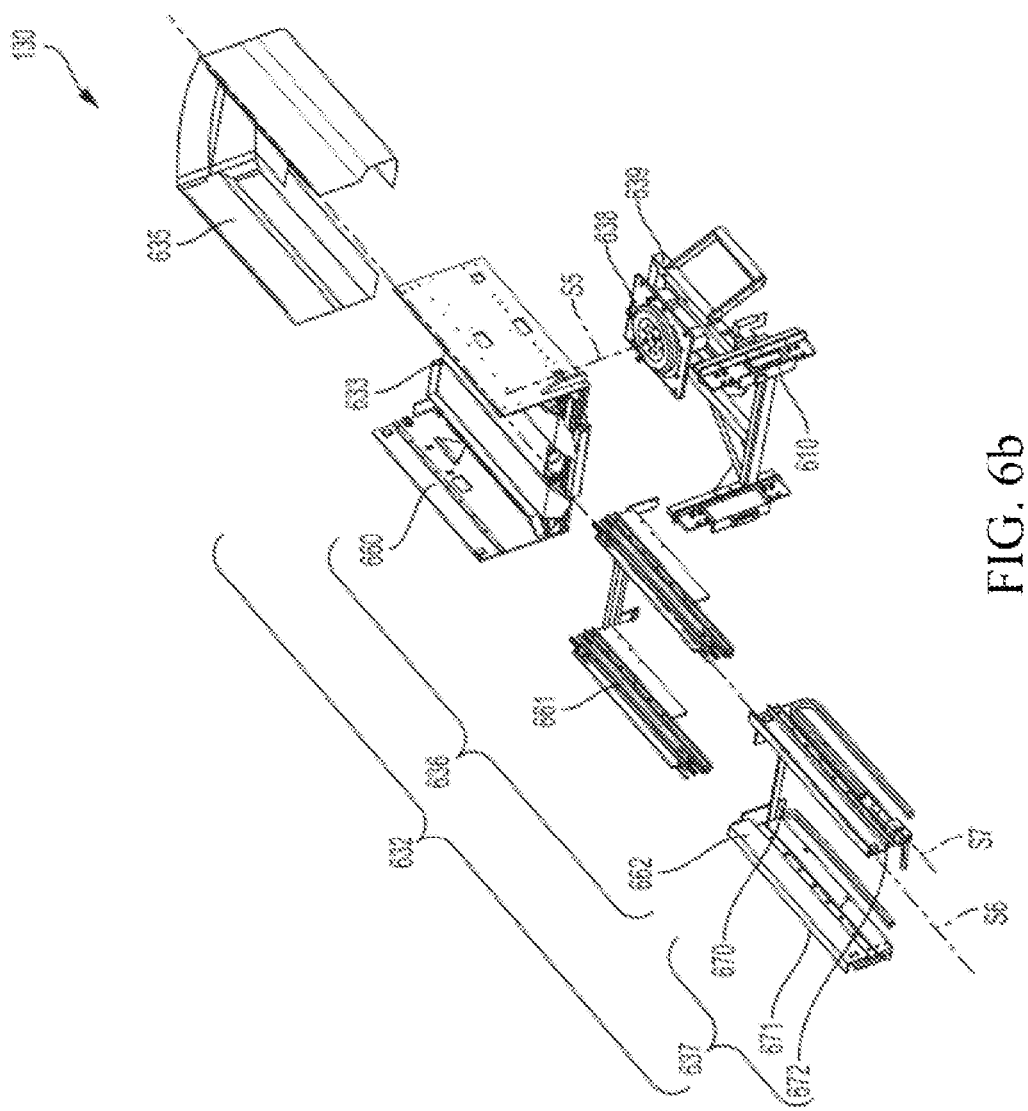

The robotic arm 632 is configured to retract or extend out along the slidable member 610 and move the tray 633 along S6. The robotic arm 632 includes a telescopic arm 636 and a push rod assembly 637 for performing retraction and extension movements. FIG. 6b shows an exploded view of the material handling device 130 according to one embodiment. Five components of the material handling device 130 are depicted in an exploded view in FIG. 6b to show detailed parts in each component. In FIG. 6a, the tray 633 is depicted on top of the slidable member 610. The tray 633 is moved to one side to expose the structure of the slidable member 610 in FIG. 6b.

Figure 7:
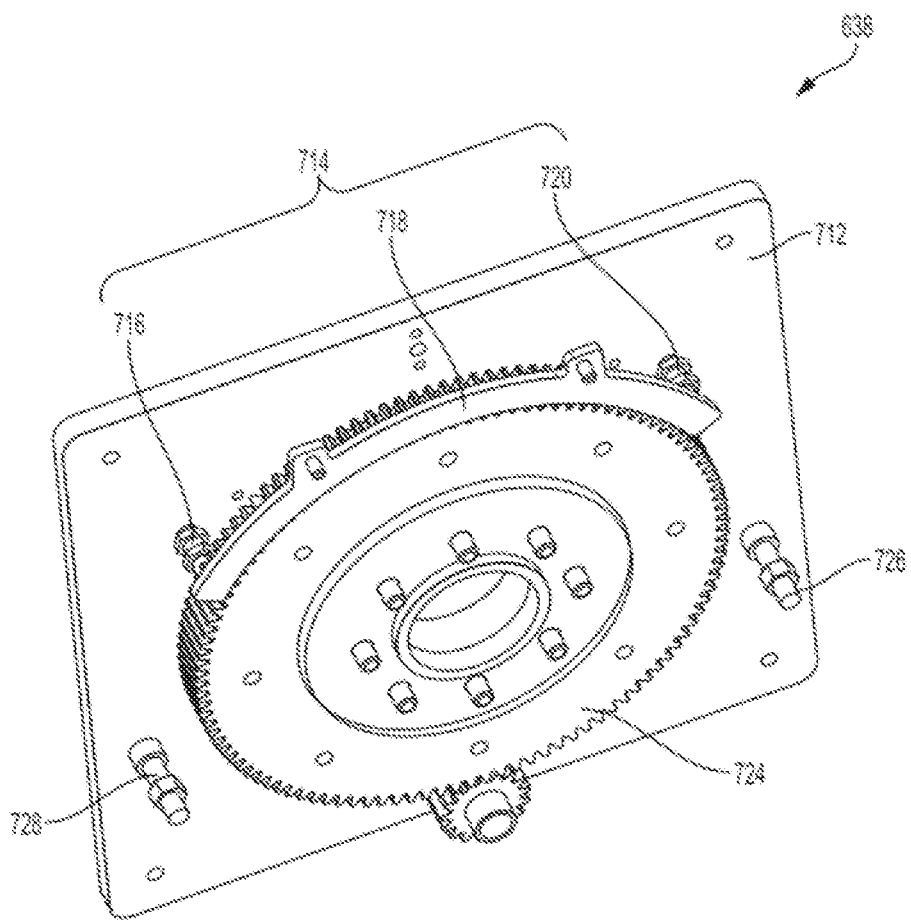
FIG. 7 is an exemplary illustration of a first embodiment of a lateral device of a material handling device.
Figure 8:
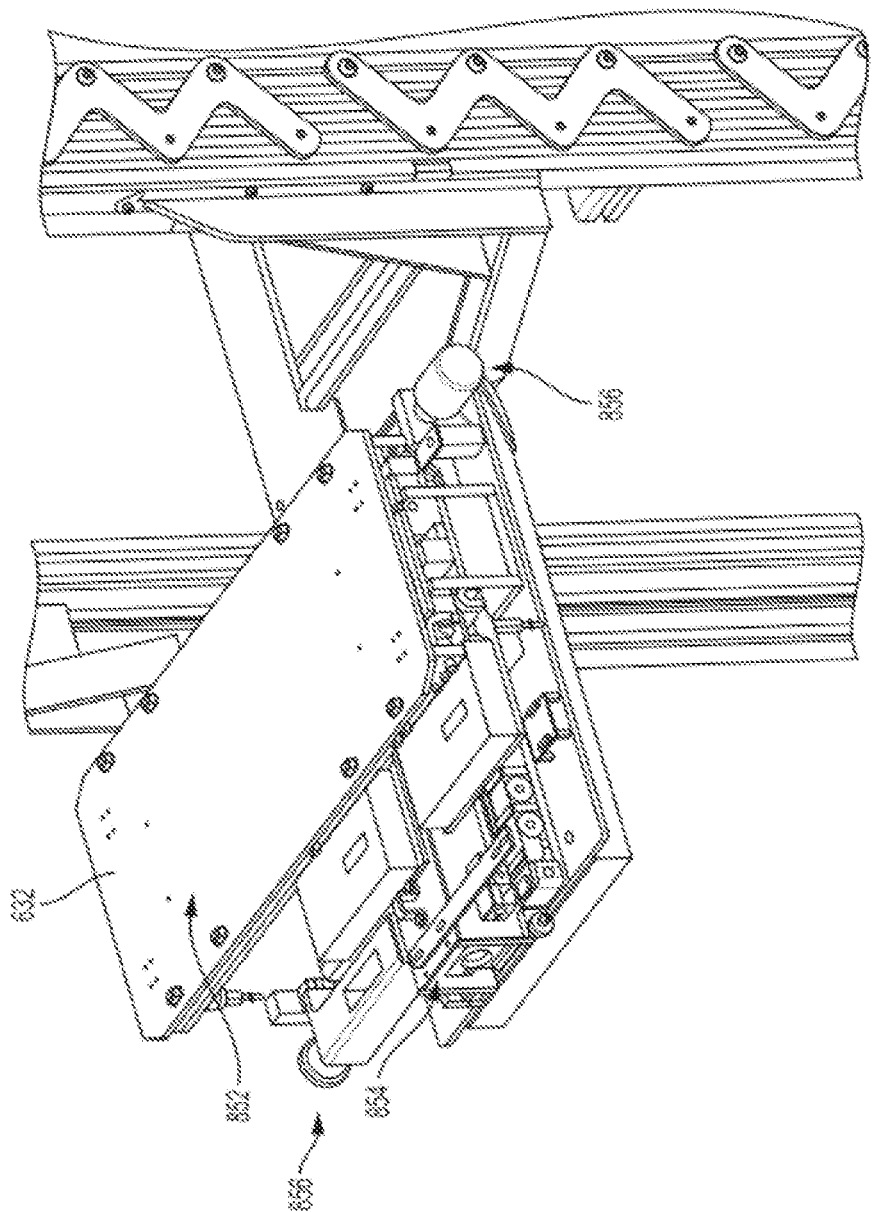
FIG. 8 is an exemplary illustration of a second embodiment of a lateral device of a material handling device.

In FIG. 6b, the slidable member 610 is connected to a rotary assembly 638 and a fork 639. The rotary assembly 638 is configured to rotate the tray 633 about S6. Details of the rotary assembly 638 are shown in FIG. 7 and explained as follows. In some embodiments, the material handling device 130 pans the tray 633 instead of rotating the tray 633, as shown in FIG. 8. The slidable member 610 is a part of the telescopic device provided in other embodiments of the present invention. The rotary assembly 638 is a part of a lateral device provided in other embodiments of the present invention. Another embodiment of the lateral device is shown in FIG. 8.

In FIG. 6*b*, the push rod assembly 637 is shown to include a fixed push rod 670, a movable push rod 671, a driving device 672, and an inner arm section 662. The inner arm section 662 may be mounted in a middle arm section 661, and the middle arm section 661 may be mounted in an outer arm section 660. The driving device 672 may drive the movable push rod 671 to open or close relative to the inner arm section 662. The movable push rod 671 may be configured to move the inventory materials onto the tray 633 or away from the tray 633. A protective plate 635 shown in FIG. 6*b* is mounted around the tray 633 to prevent the contents of the tray 633 from filling off.

Figure 6C:
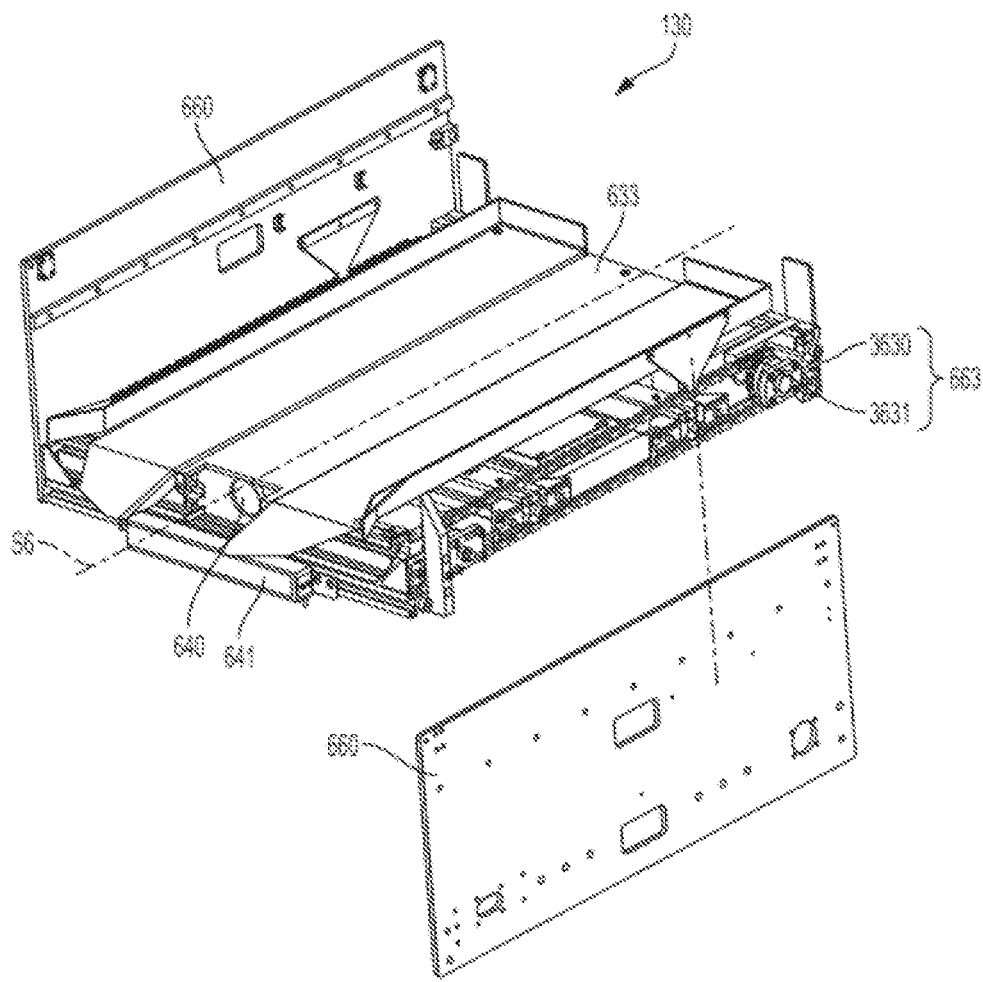
Figure 6D:
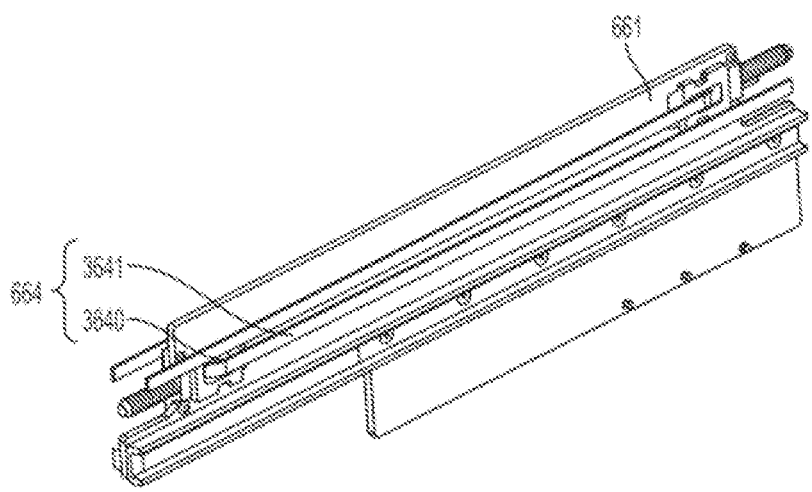

FIG. 6*c* provides another enlarged view of the material handling device 130. Two outer arm sections 660 are each mounted to each side of the tray 633. The camera 640 and the main lighting device 641 are mounted to the front of the material handling device 130. FIG. 6*c* further depicts a first driving device 663 connected to the outer arm section 660. FIG. 6*d* depicts a second driving device 664 connected to the middle arm section 661. Any of the first driving device 663 and the second driving device 664 includes a telescopic driving device (3631 and 3641 respectively) and a chain wheel device (3630 and 3640 respectively). In some embodiments, the first driving device 663 may include a chain wheel device, and the second driving device 664 may include a flat belt device (not shown). In some embodiments, the first driving device 663 or the second driving device 664 may include an open-loop flat belt device (not shown) instead of the chain wheel device or the flat belt device, so as to facilitate the extension or retraction of the material handling device 130.

As described above, the material handling device 130 is configured to rotate the tray 633 or pan the tray 633 to implement the lateral movement during storage or retrieval of one inventory material. In a crowded warehouse where shelves are placed in rows, the material handling device 130 capable of moving laterally to the interior of the shelf is particularly advantageous. The material handling device 130 may rotate the tray 633 when the AGV 100 moves between two shelves, or may move the tray 633 to the right side or the left side without rotating the entire AGV 100. Since the AGV 100 does not require a turning space, a space between the shelves may be as narrow as a width of the AGV 100. In this way, the AGV 100 requires less space than a conventional warehouse robot when moving between the shelves and picking up or storing inventory materials. FIG. 7 and FIG. 8 illustrate two embodiments for implementing lateral movement of the material handling device 130.

FIG. 7 shows the rotary assembly 638 shown in FIG. 6*b*. In FIG. 7, the rotary assembly 638 includes a rotary driving device 712 and a positioning device 714. The rotary driving device 712 includes a driving motor (not shown) and a set of driving gears 724. The driving motor is, for example, an electric motor, a hydraulic transmission system, or a pneumatic motor. The driving gear is, for example, a worm gear mechanism, a planetary gear mechanism, or other types of gear structures. The positioning device 714 includes a first angle sensor 716, a second angle sensor 720, a first proximity switch 726, a second proximity switch 728, and a detection board 718. The positioning device 714 further includes a rotation controller not shown in FIG. 7.

The first angle sensor 716 and the second angle sensor 720 are located on the circumference of the driving gear 724 and are separated by a certain distance. The two sensors are configured to detect whether the tray 633 of the material handling device 130 has rotated to a designated position. Since the tray 633 is driven by the rotating driving device 712, the first proximity switch 726 and the second proximity switch 728 move together with the tray 633. Depending on a time in which a corresponding one of the first angle sensor 716 or the second angle sensor 720 detects a corresponding one of the first proximity switch 726 or the second proximity switch 728, an angular rotation amount of the tray 633 may be detected and controlled by the rotation controller.

In some embodiments, the rotation controller of FIG. 7 controls the robotic arm 632 and the tray 633 to rotate to the right or left by 90°, to provide lateral movement of the material handling device 130 to lateral reach the shelves on the right side or on the left side. FIG. 8 shows a mechanism different from the rotary assembly 638, and the rotary assembly 638 may also be configured to provide lateral movement to the tray 633.

In FIG. 8, the robotic arm 632 includes two slidable mechanisms 852 and 854. 852 is used for X-axis motion, and 854 is used for Y-axis motion. The slidable mechanism 852 moves the robotic arm 632 to cause the robotic arm 632 to extend out or retract. The slidable mechanism 854 laterally moves the robotic arm 632 to the left side or the right side. In FIG. 8, two cameras 856 are mounted on two sides of the robotic arm 632 for optical detection. Compared with the material handling device 130 shown in FIG. 6*a*, the device may be configured to rotate to the left or right by 90°, and the material handling device 130 driven by the system shown in FIG. 8 does not rotate, but only slides to the left side or the right side. Therefore, in FIG. 6*a*, only one camera 640 is required in front of the material handling device 130, while in FIG. 8, two cameras 856 are mounted on two sides of the arm 632.

Figure 9:
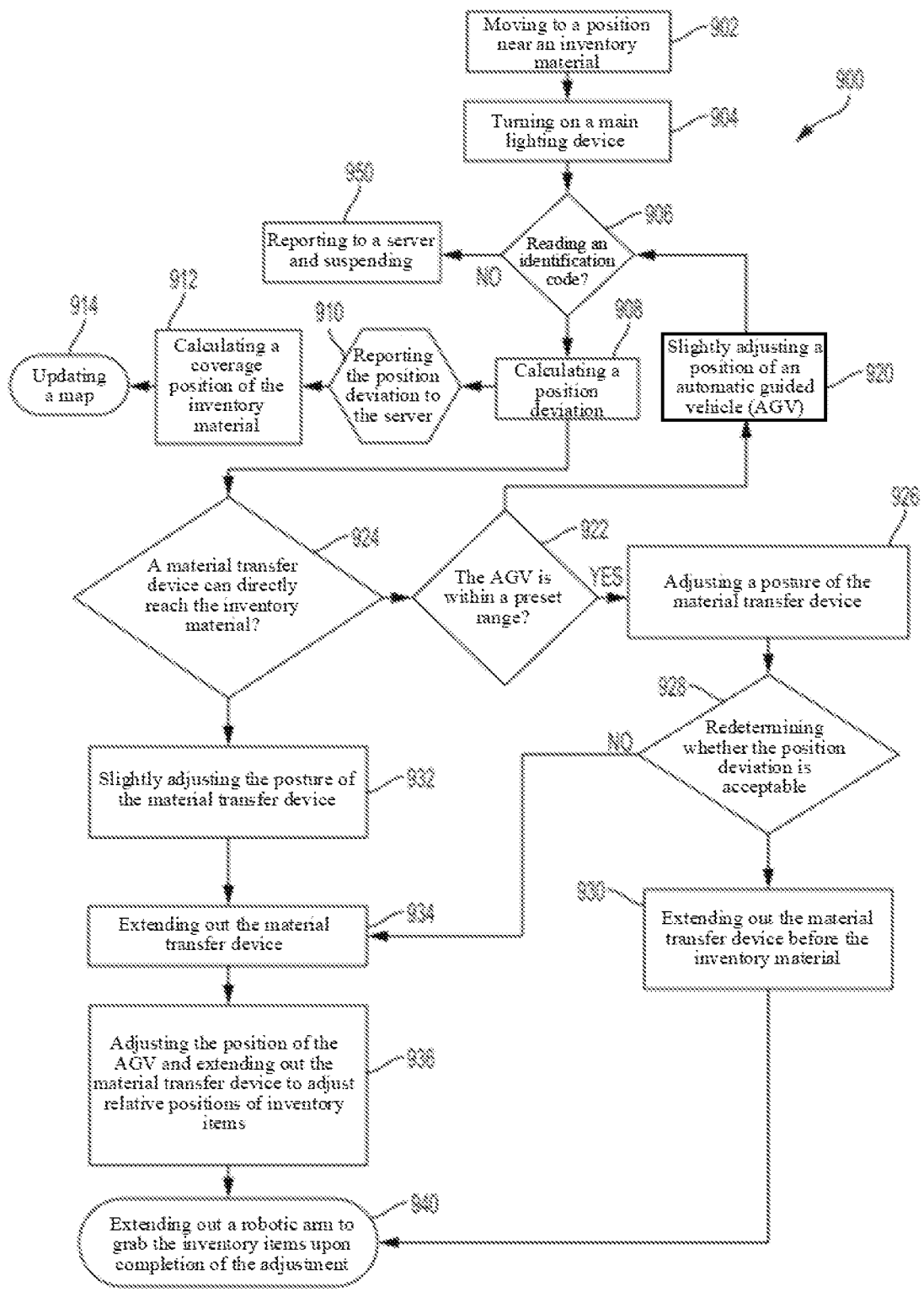
FIG. 9 is a flowchart showing a process of a warehouse AGV processing an instruction of fetching an inventory material.

FIG. 1 to FIG. 8 show an AGV 100 having advantages of agility and flexibility. FIG. 9 shows a flowchart of storing or fetching inventory materials by the AGV 100. For ease of description. FIG. 9 only shows the process of fetching the material. The storage procedures for inventory items are similar and are not described in detail for the sake of brevity. Those skilled in the art can obtain the process of storing the inventory material from the process of fetching the inventory material shown in FIG. 9.

Referring to FIG. 9, the AGV 100 receives an instruction of fetching the inventory material from a warehouse shelf. In some embodiments, the instruction may include only an identification code of the inventory material, and the AGV 100 uses the identification code to seek positioning information of the material. In some embodiments, the instruction may include positioning information of the inventory material, and the AGV 100 may extract positioning information of a to-be-fetched material according to the instruction. In one embodiment, the positioning information includes a position of the inventory material, for example, an x coordinate and a y coordinate (coordinates), a row number and a column number, or the like, and an orientation and a height of the inventory material, for example, a shelf level where the material is stored. Based on the position information of the material, the AGV 100 navigates around the warehouse and approaches the position of the inventory material.

When the AGV 100 reaches the position (step 902), the main lighting device 641 is turned on (step 904). The AGV 100 attempts to read the identification code on the inventory material (step 906). In some embodiments, the identification code may be a QR code. In other embodiments, the identification code may be any bar code. When the AGV 100 fails to read the identification code, the AGV 100 reports the result to a server and aborts a task (step 950). When the AGV 100 is capable of identifying the identification code, a position deviation of the inventory material is calculated (step 908).

The AGV 100 is configured to report, to the server, the position deviation of the inventory material obtained by the AGV (step 910). The server is configured to use the position deviation and a warehouse layout to determine an accurate position of the inventory material (step 912). Then the server updates a database of the server by using the accurate position of the inventory material (step 914).

Based on the position deviation, the AGV 100 further determines whether the material handling device 130 may directly reach the inventory material from a position of the AGV 100 (step 924). If so, the AGV 100 further adjusts or fine-tunes the posture of the material handling device 130 (step 932), and the material handling device 130 is caused to extend out during movement of the AGV 100 (step 934) to slightly adjust the relative position or orientation of the inventory material (step 936). If so, the AGV 100 further determines whether the tray 633 is within a preset range (step 922). If not, the AGV 100 slightly adjusts the position of the AGV (920) and attempts to read the identification code again (step 906). If the tray 633 is within the preset range, the AGV 100 adjusts the posture of the material handling device 130 and rotates the tray 633 (step 926). The identification code is read again to determine whether the position deviation is within a threshold range (step 928). If the position deviation is within the threshold range, the AGV 100 extends out the material handling device 130 to the inventory material (step 930). If the position deviation is inappropriate or within a preset threshold range, the AGV 100 extends out the material handling device (step 934) to adjust the posture of the AGV 100 and the relative position of the inventory materials (step 936).

Figure 10:
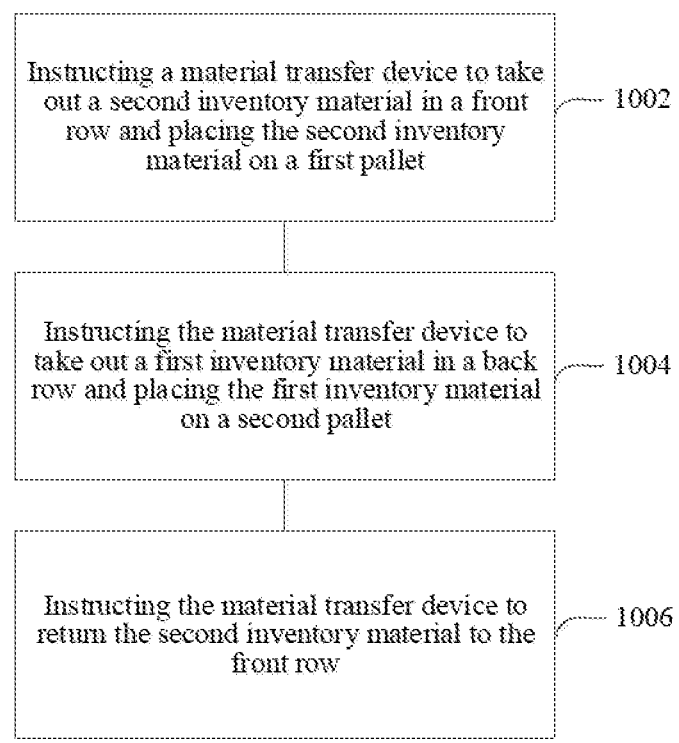
FIG. 10 is a flowchart showing a process of a warehouse AGV processing an instruction of fetching a first inventory material behind an obstacle.

Referring to FIG. 10, in some embodiments, the AGV 100 is configured to find and fetch inventory materials hidden behind an object or another inventory material. The AGV 100 is configured to receive, from the server, an instruction indicating that positioning information of a first inventory material is to be acquired. The positioning information includes a position, a depth, and an orientation of the first inventory material. If no inventory material exists in a front row, the AGV 100 is configured to acquire the first inventory material from a back row of a shelf. If a second inventory material exists in the front row, the AGV 100 is configured to acquire a second inventory material and place the second inventory material on a first tray on a multi-level shelf 120, where the first tray is empty (step 1002). The AGV 100 then fetches the first inventory material and places the first inventory material on an empty second tray on a multi-layer shelf 120 (step 1004). The AGV 100 returns the second inventory material to the shelf after fetching the first inventory material (step 1006).

In some embodiments, two or more rows of inventory materials may be allowed to be placed or stored in the shelves used in a warehouse. In the warehouse, the AGV 100 and the position information stored for each inventory material are modified or adjusted to adapt to double-row depth shelves. In the method of controlling the AGV 100 to store or fetch inventory materials placed on the shelf, the AGV 100 first receives an instruction of transporting the first inventory material. The instruction may include the position of the first inventory material, for example, the position, the depth, and the orientation of the first inventory material. If the depth of the first inventory material indicates that the material is located in the front row of the shelf the fetching process of the AGV 100 is the same as that previously described. If the depth of the first inventory material indicates that the material is located in the back row of the shelf, the fetching process of the AGV 100 may require the AGV 100 to remove the inventory material in the front row to reach the first inventory material in the back row. In some configurations, the AGV 100 is configured to acquire the second inventory material in the front row and place the second inventory material on one empty tray, and then fetch the first inventory material from the back row and place the first inventory material on another empty tray. After that, the robot returns the material in the front row to the front row. In fact, if the AGV 100 is instructed to fetch the first inventory material and the second inventory material that happen to be in a same position but in different rows, the AGV 100 does not need to return the second inventory material to the shelf.

In some embodiments, the AGV 100 is configured to detect a position deviation of the first inventory material or the second inventory material and adjust the posture and the position of the AGV 100, the position of the first inventory material before reaching the shelf to obtain the first inventory material, and the position of the second inventory material before reaching the shelf to obtain the second inventory material. In one embodiment, the AGV 100 may repeat the position adjustment process until the detected position deviation is less than a threshold. In one embodiment, the AGV 100 is configured to report the location deviation to the server to allow the server to update a map of the warehouse. The map of the warehouse can show a layout, that is, the position of the shelf and a position where the inventory material is stored.

In some embodiments, the position of the first inventory material includes coordinates and a height of the first inventory material; and the instructing the warehouse robot to move to the position of the first inventory material includes: instructing the warehouse robot to move to a position near the coordinates of the first inventory material; and instructing the material handling device to rise or fall to the height of the first inventory material.

In some embodiments, the instructing the warehouse robot to move to the position of the first inventory material further includes: instructing the material handling device to rotate to the orientation of the first inventory material. If the material handling device can handle the inventory material only in one direction, the material handling device requires to be rotated, so that the inventory material is in the handling direction of the material handling device. In some other embodiments, by adjusting the position of the AGV 100, the inventory material is located in the handling direction of the material handling device, but it takes longer and is less efficient.

In some embodiments, since there are some similar steps to fetch the first inventory material and fetch the second inventory material, in order to simplify the description of these similar steps, one inventory material is used as an example for description. The first inventory material or the second inventory material is set as a designated material, and the fetching the first inventory material or the fetching the second inventory material includes: instructing the warehouse robot to acquire a relative position of the designated inventory material to the material handling device; calculating a position deviation of the designated inventory material based on the relative position of the designated inventory material to the material handling device; adjusting a posture of the warehouse robot to compensate for the position deviation of the designated inventory material; and instructing the material handling device to extend out. It may be determined, according to the relative position of the inventory material to the material handling device, whether the material handling device can directly reach the inventory material.

In some embodiments, the fetching the first inventory material or the fetching the second inventory material further includes: after adjusting the posture of the warehouse robot and before the material handling device extending out, instructing the warehouse robot to acquire the relative position of the designated inventory material to the material handling device again, updating the relative position of the designated inventory material to the material handling device in a database, recalculating the position deviation of the designated inventory material based on the updated relative position, and readjusting the posture of the warehouse robot according to the recalculated position deviation.

In some embodiments, the fetching the first inventory material or the fetching the second inventory material further includes: after adjusting the posture of the warehouse robot and before the material handling device extending out, determining whether the material handling device is to collide with the shelf when extending out. By using the step, the material handling device or the inventory material may be prevented from damage as a result of the collision of the material handling device colliding with the shelf after extending out. If it is determined that the material handling device collides with the shelf after extending out, an error mode is entered. In the error mode, the material handling device is reset and reoperates. After the reoperation, determination is performed again. If an error still exists, the error is reported to the server, and the operation is suspended.

In some embodiments, the material handling device is instructed to rise and fall and to an identification code of the shelf, relative position of the material handling device to the shelf are acquired according to the identification code of the shelf, and it is determined, according to the relative position of the material handling device to the shelf, whether the material handling device is to collide with the shelf when extending out. The identification code of the shelf is located above or below the inventory material. If the identification code of the shelf is located above the inventory material, the material handling device is instructed to rise to read the identification code of the shelf. Conversely, the material handling device is instructed to fall to read the identification code of the shelf.

In some embodiments, the designated inventory material is the first inventory material, and the instructing the material handling device to extend out includes: instructing the material handling device to extend out to the front row and stay for a preset time; instructing the warehouse robot to acquire a relative position of the first inventory material to the material handling device; calculating the position deviation of the designated inventory material based on the relative position of the first inventory material to the material handling device; adjusting the posture of the warehouse robot to compensate for a position deviation of the first inventory material; and instructing the material handling device to continue to extend to the back row. When the material handling device extends out to the front row, a distance between the material handling device and the first inventory material is shortened, so as to improve the accuracy of the acquired relative position.

In some embodiments, the instructing the material handling device to extend out further includes: instructing the material handling device to continue to extend out by a preset distance if the warehouse robot fails to acquire the relative position of the first inventory material to the material handling device, and instructing the warehouse robot to acquire the relative position of the first inventory material to the material handling device again during the extension of the material handling device.

In some embodiments, the instructing the material handling device to extend out further includes: after adjusting the posture of the warehouse robot and before the material handling device continuing to extend to the back row, instructing the warehouse robot to acquire the relative position of the first inventory material to the material handling device again, updating the relative position of the first inventory material to the material handling device in a database, recalculating the position deviation of the first inventory material based on the updated relative position, and readjusting the posture of the warehouse robot according to the recalculated position deviation.

In some embodiments, the relative position of the designated inventory material to the material handling device are acquired by instructing the material handling device to capture image information of the designated inventory material and by processing the image information according to an image difference algorithm.

In some embodiments, the relative position of the designated inventory material to the material handling device are acquired by an identification code of the designated inventory material read by the material handling device.

In some embodiments, if the material handling device fails to read the identification code of the designated inventory material, the material handling device is instructed to repeatedly rise and fall by a preset amplitude, and during the rise and fall of the material handling device, the material handling device is instructed again to read the identification code of the designated inventory material. If the identification code of the inventory material fails to be read again, the error mode is entered.

In some embodiments, when the material handling device successfully reads the identification code of the designated inventory material, it is determined whether the identification code is upside down. If the identification code is upside down, report the result to the server to notify the staff to make corrections.

In some embodiments, the adjusting a posture of the warehouse robot includes: adjusting a chassis of the warehouse robot, and/or rotating the material handling device if the identification code of the designated inventory material within a field of view of the material handling device is not complete, so that the identification code of the designated inventory material within a field of view of a camera is more complete.

Compared with the prior art, in the method for controlling a warehouse robot to store and fetch inventory materials provided in this application, the material handling device moves the inventory materials to the trays, so that the inventory materials can be extracted from a designated shelf and stored in a warehouse, navigation is realized in a crowded warehouse filled with obstacles, and the inventory materials whose positions have been transferred can be processed.

In addition, by instructing the material handling device to fetch the first inventory material located behind the second inventory material, the shelf may be arranged in a front row and a back row, thereby reducing the area occupied by the shelf in the warehouse, and facilitating the fetching of hidden inventory materials.

Although the present invention has been described herein with reference to specific embodiments, the present invention is not limited to the details that are shown. Conversely, within the scope of the claims, various modifications of the details may be made without departing from the disclosure.

What is claimed is:

1. A method for controlling a warehouse robot to store and fetch inventory materials, wherein the inventory materials on a shelf are arranged in a front row and a back row, the warehouse robot comprises a material handling device and a multi-level shelves, and the method comprises the following steps:

receiving an instruction of transporting a first inventory material;

acquiring positioning information of the first inventory material from the received instruction, wherein the positioning information of the first inventory material comprises a position, a depth, and an orientation of the first inventory material, wherein the depth of the first inventory material indicates that the first inventory material is located in the back row;

instructing the warehouse robot to move to the position of the first inventory material;

detecting whether a second inventory material is located in the front row of the first inventory material;

extending the material handling device to the back row to acquire the first inventory material if no second inventory material exists in the front row;

fetching the second inventory material from the front row and placing the second inventory material on an empty first tray of the multi-level shelves of the warehouse robot if the second inventory material exists in the front row;

fetching the first inventory material from the back row and placing the first inventory material on an empty second tray of the multi-level shelves of the warehouse robot; and returning the second inventory material to the shelf, wherein extending the material handling device to fetch the inventory material comprises the following steps:

the warehouse robot reading an identification code of the shelf to calculate a position deviation of the inventory material, and determining whether the material handling device can directly reach the inventory material from a position of the warehouse robot based on the position deviation;

determining whether a tray of the material handling device is within a preset range if the inventory material cannot be reached directly, and adjusting the posture of the material handling device and rotating the tray if the tray is within the preset range, then reading the identification of the shelf code again to determine whether the position deviation is within the threshold range;

adjusting the posture of the warehouse robot and a relative position of the material handling device to the inventory material if the position deviation is not within the threshold range, and extending a robotic arm of the material handling device after the adjusting is completed to move the inventory material to the tray of the material handling device; wherein the robotic arm is used to drive the tray to move when retracting or extending along a sliding part of the material handling device.

2. The method according to claim 1, wherein the position of the first inventory material comprises coordinates and a height of the first inventory material; and the step of instructing the warehouse robot to move to the position of the first inventory material comprises the following steps:

instructing the warehouse robot to move to a position near the coordinates of the first inventory material; and instructing the material handling device to rise or fall to the height of the first inventory material.

3. The method according to claim 2, wherein the step of instructing the warehouse robot to move to the position of the first inventory material further comprises the following steps:

instructing the material handling device to rotate to the orientation of the first inventory material.

4. The method according to claim 1, wherein the first inventory material or the second inventory material is set as a designated material, and the step of fetching the first inventory material or the step of fetching the second inventory material comprises:

instructing the warehouse robot to acquire a relative position of the designated inventory material to the material handling device;

calculating a position deviation of the designated inventory material based on the relative position of the designated inventory material to the material handling device;

adjusting a posture of the warehouse robot to compensate for the position deviation of the designated inventory material; and instructing the material handling device to extend out.

5. The method according to claim 4, wherein the step of fetching the first inventory material or the step of fetching the second inventory material further comprises the following steps:

after adjusting the posture of the warehouse robot and before the material handling device extending out, instructing the warehouse robot to acquire the relative position of the designated inventory material to the material handling device again, updating the relative position of the designated inventory material to the material handling device in a database, recalculating the position deviation of the designated inventory material based on the updated relative position, and readjusting the posture of the warehouse robot according to the recalculated position deviation.

6. The method according to claim 4, wherein the step of fetching the first inventory material or the step of fetching the second inventory material further comprises:

after adjusting the posture of the warehouse robot and before the material handling device extending out, determining whether the material handling device is to collide with the shelf when extending out.

7. The method according to claim 6, wherein the material handling device is instructed to rise and fall to read an identification code of the shelf, relative position of the material handling device to the shelf are acquired according to the identification code of the shelf, and it is determined according to the relative position of the material handling device to the shelf whether the material handling device is to collide with the shelf when extending out.

8. The method according to claim 4, wherein the designated inventory material is the first inventory material, and the step of instructing the material handling device to extend out comprises the following steps:

instructing the material handling device to extend to the front row;

instructing the warehouse robot to acquire a relative position of the first inventory material to the material handling device;
calculating the position deviation of the designated inventory material based on the relative position of the first inventory material to the material handling device;
adjusting the posture of the warehouse robot to compensate for a position deviation of the first inventory material; and
instructing the material handling device to continue to extend to the back row.

9. The method according to claim 8, wherein the step of instructing the material handling device to extend out further comprises:
instructing the material handling device to continue to extend out by a preset distance if the warehouse robot fails to acquire the relative position of the first inventory material to the material handling device, and instructing the warehouse robot to acquire the relative position of the first inventory material to the material handling device again during the extension of the material handling device.

10. The method according to claim 8, wherein the step of instructing the material handling device to extend out further comprises:
after adjusting the posture of the warehouse robot and before the material handling device continuing to extend to the back row, instructing the warehouse robot to acquire the relative position of the first inventory material to the material handling device again, updating the relative position of the first inventory material to the material handling device in a database, recalculating the position deviation of the first inventory material based on the updated relative position, and readjusting the posture of the warehouse robot according to the recalculated position deviation.

11. The method according to claim 4, wherein the relative position of the designated inventory material to the material handling device are acquired by instructing the material handling device to capture image information of the designated inventory material and processing the image information according to an image difference algorithm.

12. The method according to claim 4, wherein the relative position of the designated inventory material to the material handling device are acquired by an identification code of the designated inventory material read by the material handling device.

13. The method according to claim 12, wherein if the material handling device fails to read the identification code of the designated inventory material, the material handling device is instructed to repeatedly rise and fall by a preset amplitude, and during the rise and fall of the material handling device, the material handling device is instructed again to read the identification code of the designated inventory material.

14. The method according to claim 12, wherein when the material handling device successfully reads the identification code of the designated inventory material, it is determined whether the identification code is upside down.

15. The method according to claim 12, wherein the step of adjusting a posture of the warehouse robot comprises at least one of:
adjusting a chassis of the warehouse robot, and rotating the material handling device if the identification code of the designated inventory material within a field of view of the material handling device is not complete, so that the identification code of the designated inventory material within the field of view of a camera is more complete.

16. A method for controlling a warehouse robot to store and fetch inventory materials, wherein the inventory materials on a shelf are arranged in a front row and a back row, and the method comprises the following steps:
receiving an instruction of transporting a first inventory material;
acquiring positioning information of the first inventory material from the received instruction, wherein the positioning information of the first inventory material comprises a position, a depth, and an orientation of the first inventory material, wherein the depth of the first inventory material indicates that the first inventory material is located in the back row;
instructing the warehouse robot to move to the position of the first inventory material;
detecting whether a second inventory material is located in the front row of the first inventory material;
extending a material handling device to the back row to acquire the first inventory material if no second inventory material exists in the front row;
fetching the second inventory material from the front row and placing the second inventory material on an empty first tray if the second inventory material exists in the front row;
fetching the first inventory material from the back row and placing the first inventory material on an empty second tray; and
returning the second inventory material to the shelf,
wherein extending the material handling device to fetch the inventory material comprises the following steps:
the warehouse robot reading an identification code of the shelf to calculate a position deviation of the inventory material, and determining whether the material handling device can directly reach the inventory material from a position of the warehouse robot based on the position deviation;
determining whether the tray of either the first empty tray or the second empty tray is within a preset range if the inventory material cannot be reached directly, and adjusting the posture of the material handling device and rotating the tray if the tray is within the preset range, then reading the identification of the shelf code again to determine whether the position deviation is within the threshold range;
adjusting the posture of the warehouse robot and a relative position of the material handling device to the inventory material if the position deviation is not within the threshold range, and extending a robotic arm of the material handling device after the adjusting is completed to move the inventory material to the tray of the material handling device; wherein the robotic arm is used to drive the tray to move when retracting or extending along a sliding part of the material handling device.

17. The method according to claim 16, wherein the position of the first inventory material comprises coordinates and a height of the first inventory material; and
the step of instructing the warehouse robot to move to the position of the first inventory material comprises the following steps:
instructing the warehouse robot to move to a position near the coordinates of the first inventory material; and
instructing the material handling device to rise or fall to the height of the first inventory material.

18. The method according to claim 17, wherein the step of instructing the warehouse robot to move to the position of the first inventory material further comprises the following steps:
- instructing the material handling device to rotate to the orientation of the first inventory material.

19. The method according to claim 16, wherein the first inventory material or the second inventory material is set as a designated material, and the step of fetching the first inventory material or the step of fetching the second inventory material comprises:
- instructing the warehouse robot to acquire a relative position of the designated inventory material to the material handling device;
- calculating a position deviation of the designated inventory material based on the relative position of the designated inventory material to the material handling device;
- adjusting a posture of the warehouse robot to compensate for the position deviation of the designated inventory material; and
- instructing the material handling device to extend out.

20. The method according to claim 19, wherein the step of fetching the first inventory material or the step of fetching the second inventory material further comprises:
- after adjusting the posture of the warehouse robot and before the material handling device extending out, determining whether the material handling device is to collide with the shelf when extending out.

\* \* \* \* \*